UNITED STATES PATENT OFFICE.

JULIUS KANTOROWICZ, OF BRESLAU, GERMANY.

PROCESS OF MANUFACTURING STARCH SOLUBLE IN COLD WATER.

984,483.  
Specification of Letters Patent. Patented Feb. 14, 1911.  
No Drawing. Application filed April 17, 1906. Serial No. 312,069.

*To all whom it may concern:*

Be it known that I, JULIUS KANTOROWICZ, a subject of the King of Prussia, German Emperor, residing at 5–7 Kaiser Wilhelm strasse, in the city of Breslau, Kingdom of Prussia, German Empire, have invented new and useful Improvements in Processes of Manufacturing Starch Soluble in Cold Water, of which the following is a specification.

This invention relates to the process of manufacturing starch, soluble in cold water, by means of caustic alkalis, and has for its object to avoid the formation of paste during the action of the caustic alkalis on the starch. This object will be obtained according to the present invention by suspending starch in a solution of an alkali salt precipitating starch from solutions of starch, and by treating the said suspension of the starch with a solution of caustic alkalis.

I may carry out my invention in the following way: 100 kilograms of meal of potato-starch are well mixed with 25 liters of a solution of 125 kilograms of crystallized sulfate of sodium dissolved at about 40 degrees centigrade in 25 liters of water. In order to prepare a thoroughly intimate mixture of the starch with the solution of sulfate of sodium I may also take a larger amount of the solution of sulfate of sodium. A mixture of 40 kilograms of caustic soda-lye of 35 degrees Baumé with 100 kilograms of a concentrated, preferably saturated solution of sulfate of sodium is then added to the said suspension of starch in a solution of sulfate of sodium. The whole mass is well mixed and is then allowed to stand for a suitable time, for instance 10 minutes. The liquid is then separated from the starch, which may be effected for instance by pressing the mass. Finally the starch is dried and pulverized.

The alkaline starch obtained by my process is not identical with a mere mixture of starch with pulverized caustic soda or potash. The difference is very essential. A mixture of starch with caustic soda or potash loses the property of being soluble in cold water, if the caustic alkali has been transformed by the carbonic acid of the air into the carbonate, which transformation cannot be avoided practically. The starch obtained according to the present process however is soluble, even if the caustic alkali has been converted into carbonate or has been neutralized by acids.

When a mere mixture of starch with pulverized caustic soda or potash comes in contact with water, a paste is formed from the starch by the action of the solution of caustic soda on starch. In the present process, however, the salts prevent the momentary paste-forming action of the alkali on starch.

Before the separation of the alkali salt solution, the caustic alkali may be neutralized by any suitable inorganic or organic acid. The caustic alkali may also be converted by the addition of a suitable ammonium salt into the salt of the acid of the ammonium salt. In this case, free ammonia will be formed and is separated from the starch by the drying process. The transformation of the caustic alkali into salts may also be effected by addition of a salt of magnesium or calcium to the mixture of the caustic alkali, starch, water and alkali salts or by adding a solid acid, an acid salt or a salt of magnesium or calcium to the alkaline dried starch. The skilled workman will select the method suitable for his special purpose by experiments.

I may use any alkali salt precipitating starch from their solutions. I may use neutral, basic or acid salts, of organic or inorganic acids. As the most suitable salts I have found neutral or acid sulfate of sodium (or potassium), neutral or acid carbonate of sodium (or potassium). The skilled workman will select the salts suitable for his special purposes according to the actual costs of the salts and the possibility to obtain large amounts.

What I claim as my invention and desire to secure by Letters Patent, is:—

The process for manufacturing starch soluble in cold water which consists in adding caustic alkalis to starch suspended in solutions of salt of the alkalis by which the starch is precipitated, then adding acids and separating the liquid from the starch.

In testimony whereof I have signed my name to this specification in the presence of two subscribing witnesses.

JULIUS KANTOROWICZ.

Witnesses:
  A. W. MAN,
  ERNST KATZ.